United States Patent [19]

Nelson

[11] 4,133,159

[45] Jan. 9, 1979

[54] GLAZING HOLD-DOWN CLAMP FOR SOLAR ENERGY COLLECTORS

[76] Inventor: Cecil O. Nelson, 6324 Parsifal Pl., Las Vegas, Nev. 89107

[21] Appl. No.: 825,850

[22] Filed: Aug. 18, 1977

[51] Int. Cl.² .............................................. E04C 2/00
[52] U.S. Cl. ................................................... 52/822
[58] Field of Search ....................... 52/202, 624–627, 52/584; 126/271; 237/1 A

[56] References Cited

U.S. PATENT DOCUMENTS

| | | | |
|---|---|---|---|
| 2,613,402 | 10/1952 | Gouge | 52/202 X |
| 2,927,354 | 3/1960 | Lauer | 52/202 X |
| 3,145,810 | 8/1964 | Ellard et al. | 52/624 X |
| 3,296,763 | 1/1967 | Curl | 52/624 X |
| 3,675,954 | 7/1972 | Konig | 52/624 |

Primary Examiner—J. Karl Bell
Attorney, Agent, or Firm—Clarence A. O'Brien; Harvey B. Jacobson

[57] ABSTRACT

A hold-down clamp has a longitudinally extending element provided with a first rail and a second rail spaced from one another, with the first rail being engageable with a circumferential edge of a framework on which the second rail clamps an edge of a sheet of material, such as glass. A securing arrangement anchors the longitudinally extending element to the framework so as to create the desired clamping action. The securing arrangement advantageously includes a plurality of fasteners disposed in spaced relation along the longitudinal extent of the element.

5 Claims, 4 Drawing Figures

GLAZING HOLD-DOWN CLAMP FOR SOLAR ENERGY COLLECTORS

BACKGROUND OF THE INVENTION

1. Field of the Invention

This invention relates generally to a hold-down clamp, and particularly to a clamp for holding glass, and the like, on the frame of a box-type solar energy collector.

2. Description of the Prior Art

The tray or box-type solar collector in the form of a generally rectangular open framework having a bottom wall and disposed on a roof, and the like, so as to be oriented toward the sun in order to heat water placed in the tray formed by the collector is usually covered by a sheet of glass, plastic film, and the like, in order to heat rays within the structure itself.

A difficulty encountered with such collectors is that the glazing should be sealed in an airtight manner to the framework of the collector. Leaks along the juncture of the glazing and the framework can greatly reduce efficiency of the collector.

U.S. Pat. Nos: 504,890, issued Sept. 12, 1893, to E. C. Ohmart; 1,888,620, issued Nov. 22, 1932, to W. F. Clark, 2,705,948, issued Apr. 12, 1955, to G. H. Rostock; 2,902,028, issued Sept. 1, 1959, to A. H. Manly; 3,236,294, issued Feb. 22, 1966, to H. E. Thomason; and 3,937,208, issued Feb. 10, 1976, to H. S. Katz, et al., disclose solar energy collection systems wherein a collecting apparatus is generally in the form of a tray or box-like structure provided with a covering sheet secured to the frame of the structure by various techniques.

SUMMARY OF THE INVENTION

It is an object of the present invention to provide a hold-down clamp which will permit a seal to be achieved along the length of a juncture between two longitudinally extending structures.

It is another object of the present invention to provide a hold-down clamp which will rigidify structures with which it is associated, while providing for an airtight, waterproof, dust-proof, and moistureproof seal at a juncture between the structures.

It is yet another object of the present invention to provide a hold-down clamp for retaining glazing on the frame of a solar collector, which clamp permits the glazing to be easily replaced.

It is a still further object of the present invention to provide a hold-down clamp which is economical to manufacture and easily installed.

These and other objects are achieved according to the present invention by providing a hold-down clamp having: a longitudinally extending element provided with a first rail and a second rail spaced from one another, with the first rail being engageable with a framework of an associated structure, and the second rail being engageable with a sheet, specifically an edge of the sheet, to be held-down against the framework.

The longitudinally extending element preferably has a transverse cross section including a web arranged extending between the first rail and second rail, with the first rail and second rail cooperating to form the limits of the transverse extent of the element. The web is offset from the rails in the transverse cross section of the element, such that only points of the element, or more specifically the rails, are engageable with the framework and sheet. The rails each advantageously have curved abutment surfaces in the transverse cross section, with these curved abutment surfaces being arranged for permitting adjustment of the element to varying thickness of sheeting to be held-down.

The points of contact between the abutment surfaces of the rails and abutting surfaces of the framework and sheeting can be considered as lying in a common plane. With this in mind, the web can be described as extending at an acute angle from the first rail to the second rail in order to form an inclined surface extending away from the plane of the points of contact in the direction from the first rail to the second rail. At least one wedge-shaped member is mounted on the inclined surface of the element, with this member extending only a small part of the longitudinal extent of the element. The wedge-shaped member is arranged forming a face spaced from the inclined surface, and from the rails, which is substantially parallel to the plane passing through the points of contact of the rails with the framework and sheeting.

A hole is provided extending through the member and web, and being disposed perpendicularly to the plane of the face of the member and the plane passing through the points of contact of the element, with the clamp further including a securing arrangement comprising a bolt and nut. The bolt is removably arrangeable in the hole for anchoring the element to the framework.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
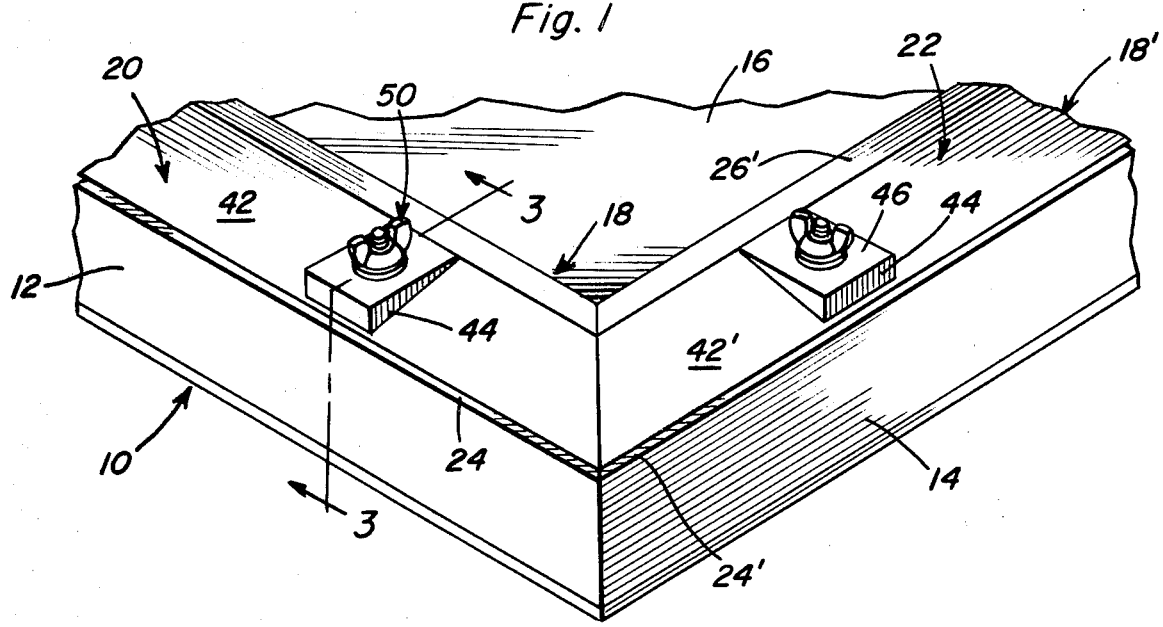
FIG. 1 is a fragmentary, perspective view showing one corner of a solar collector tray, and the like, having a sheet of glazing held down by clamps according to the present invention.
Figure 2:
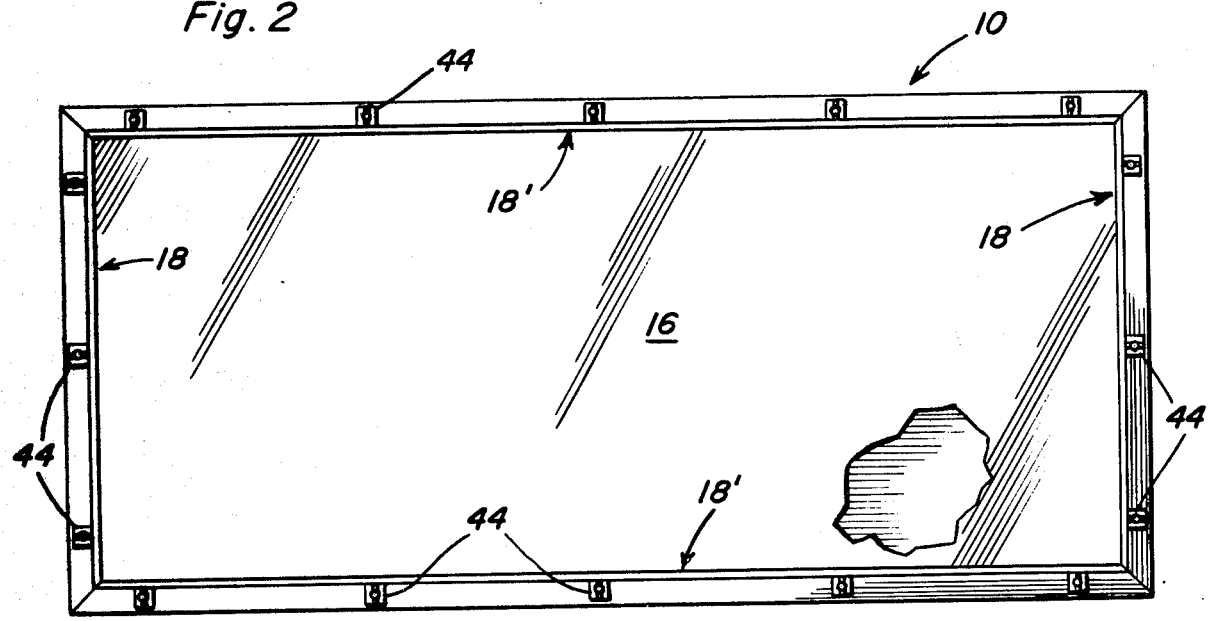
FIG. 2 is a schematic, top plan view, partly broken away, showing at a smaller scale than FIG. 1 a solar collector having glazing held down by clamps according to the present invention.

Referring now more particularly to the figures of the drawing, a solar collector, for example, is shown as including a generally rectangular framework 10 having substantially parallel pairs of edges 12 and 14. A sheet 16, which may be conventional glass, and the like, is secured to the edges 12 of framework 10 by a plurality of hold-down clamps 18, 18' according to the present invention, with each of the edges 12, 14 having a respective one of the clamps 18, 18' associated therewith.

Each of the clamps 18, 18', differing only in length and the number of securing arrangements provided thereon, comprises a longitudinally extending element 20, 22 provided with a first rail 24, 24' and a second rail 26, 26' spaced from one another. Rail 24, 24' is engageable with an associated edge 12, 14 of framework 10, while rail 26, 26' is engageable with an associated edge portion of the sheet 16 to be held-down on framework 10 by the clamps 18, 18'.

Longitudinal extending element 20, 22 has a transverse cross section partially formed by a web 28, 28' arranged extending between the spaced rails 24, 24' and 26, 26'. The latter mentioned rails form the limits of the transverse extent of element 20, 22. The web 28, 28' is offset from the rails 24, 24' and 26, 26' so as to permit portions of these rails, as seen in the transverse cross section of element 20, 22, to define the only points 30 and 32 of engagement of element 20, 22 with framework 10 and sheet 16. Rails 24, 24' and 26, 26' each have curved abutment surfaces 34 and 36 in transverse cross section, with these curved abutment surfaces 34 and 36 being arranged for permitting adjustment of the element 20, 22 to varying thicknesses of sheeting 16 to be held-down.

Figure 3:
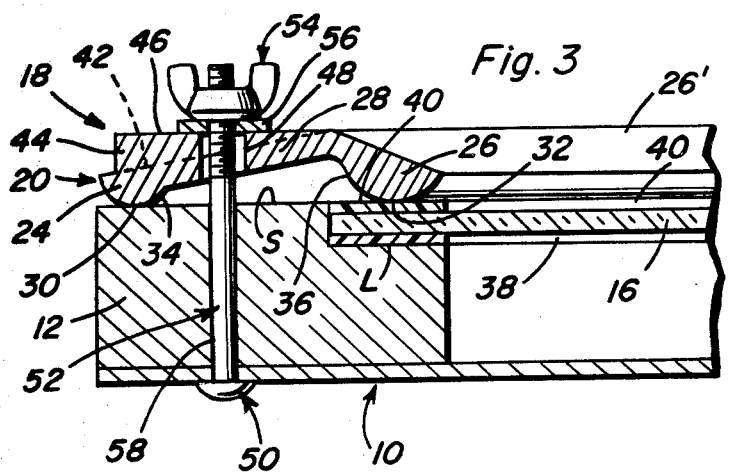
FIG. 3 is an enlarged, fragmentary, sectional view taken generally along the line 3—3 of FIG. 1.
Figure 4:
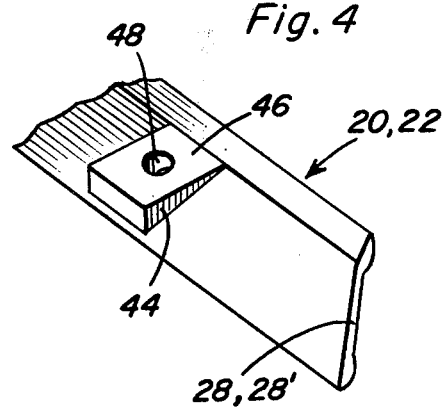
FIG. 4 is a fragmentary, perspective view showing one end portion of a clamp according to the present invention.

Strip seals 38 and 40 are provided on each of the elements 20 and 22 so as to insure a good seal around the juncture of sheet 16 with an associated edge 12, 14. In order to assure the requisite seal, a ledge L is advantageously cut into the upper inside portion of the associated one of the edges 12, 14. In this manner, the glazing will be more or less in a straight line with the upper surface of the casing or edge 12, 14, as seen in FIG. 3.

The points 30 and 32 at which the rails 24, 24' and 26, 26' contact the upper surface S of an associated edge 12, 14 and the seal 40, or upper surface of sheet 16, can be considered as lying in a common plane, as is especially the case when the ledge L is provided as described below, and web 28, 28' can be seen to extend at an acute angle from rail 24, 24' to the second rail 26, 26' so as to form a surface 42, 42' inclined away from the plane of the points 30, 32. At least one wedge-shaped member 44, and preferably the illustrated plurality of such members, is mounted on the inclined surface 42, 42' of element 20, 22 and is arranged extending only a small part of the longitudinal extent of the associated element 20, 22. This member 44 is arranged forming a face 46 spaced from the inclined surface 42, 42' and disposed substantially parallel to the plane of points 30 and 32.

Preferably, the number of members 44 spaced along the longitudinal extents of elements 20 and 22 will be such as to prevent the associated strip or element 20, 22 from bowing or bending. Further, it can be seen that although it is desirable to have either the upper surface of a seal 40 or the upper surface of sheet 16 flush with the upper surface S of the associated edge 12, 14, the curved surfaces 34, 36 of the elements 20, 22 will permit adjustment of a clamp 18, 18' to accommodate varying thicknesses of a sheet 16 disposed on ledge L.

Although a strip seal 40 is shown in the drawings as being disposed between the upper surface of sheet 16 and the curved abutment surface 36 of a rail 26, 26', it is to be understood that other sealing arrangements can be employed, such as coating the surface 36 with a suitable sealing material in a manner not shown. In addition, although the members 44 are shown in the drawings as being integral parts of their associated elements 20, 22, it is to be understood that the members 44 can be articles separate from the associated elements 20, 22 if desired.

A hole 48 is provided through each of the members 44 and the web 28, 28' associated with each such member 44 for receiving a securing arrangement 50, advantageously in the form of a conventional bolt 52 and associated wing nut 54, for example, and washer 56. The securing arrangement 50 removably anchors the associated element 20, 22 to the framework 10, as can be readily seen from FIG. 3. The hole 48 should be larger than the diameter of the shank of bolt 52 in order to permit adjustment of the element 20, 22 as discussed above. The shank of bolt 52 can extend through a bore 58 provided in the associated edge 12, 14 of framework 10 in a conventional manner and extending from top to bottom, with nut 54 advantageously being arranged uppermost to facilitate installation and removal of the associated solar collector on a roof (not shown), and the like.

As can be readily understood from the above description and from the drawing, a hold-down clamp according to the present invention provides, in a simple and reliable manner, a device for sealing a sheet, and the like, over a substantial longitudinal extent. Such a seal will be hermetic, and can be conditioned to withstand various solvents, and the like, by appropriate selection of the sealing materials. Further, the clamp can be readily adjusted to receive various thicknesses of sheets being held down.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A hold-down clamp, comprising a longitudinally extending element provided with a first rail and a second rail spaced from one another, with the first rail being engageable with a framework, and the second rail being engageable with a sheet to be held-down on the framework, the longitudinally extending element has a transverse cross section including a web arranged extending between the spaced first rail and second rail, with the first rail and second rail forming the limits of the transverse extent of the element, and the web arranged offset from the first rail and second rail and portions of the first rail and second rail in transverse cross section of the element being engageable with the framework and sheet being held-down, the first rail and second rail each have curved abutment surfaces in the transverse cross section, the curved abutment surfaces being arranged for permitting adjustment of the element to varying thicknesses of sheeting to be held-down, the curved abutment surfaces formed in the transverse cross section of the element having only point contact with the framework and sheet, with the points lying in a common plane and the web extending at an acute angle from the first rail to the second rail and forming a surface inclined away from the plane of the points of contact of the element, an inclined surface being formed by the web, and at least one wedge-shaped member being mounted on the inclined surface formed by the web and arranged extending only along a small part of the longitudinal extent of the element, the wedge-shaped member being arranged forming a face spaced from the inclined surface, and from the first rail and second rail, which face is oriented substantially parallel to the plane passing through the points of contact of the element with the framework and sheeting.

2. A structure as defined in claim 1, wherein a hole is provided through the wedge-shaped member and the web, the hole being disposed perpendicularly with respect to the plane passing through the points of contact of the element with the framework and sheeting, and further including securing means comprising a bolt and nut, the bolt being removably arrangeable in the hole, for anchoring the element to the framework.

3. A structure as defined in claim 2, wherein there are a plurality of the wedge-shaped members spaced along the longitudinal extent of the element, and the securing means including a like number of bolts and nuts as there are wedge-shaped members for securing the element to the framework at locations corresponding to the wedge-shaped members.

4. In combination with a framework defining a circumferential edge and a sheet clamped to the edge of the framework, a hold-down clamp, comprising, in combination:

(a) a longitudinally extending element provided with a first rail and a second rail spaced from one another, the first rail contacting the sheet; and (b) securing means spaced along the longitudinal extent of the element for anchoring the element to the framework, the longitudinally extending element having a transverse cross section including a web arranged extending between the spaced first rail and second rail, the first rail and second rail forming the limits of the transverse extent of the element, and the web being arranged offset from the first rail and second rail, with portions of the first rail and second rail in transverse cross section of the element contacting the framework and sheet, the first rail and second rail each having curved abutment surfaces in the transverse cross section, with the curved abutment surfaces being arranged for permitting adjustment of the element to varying thicknesses of the sheet, the curved abutment surfaces engaging the framework and sheet at points thereon, which points lie in a common plane, and the web extending at an acute angle from the first rail to the second rail and forming a surface inclined away from the plane of the points of contact of the element, the web thus forming an inclined surface, and at least one wedge-shaped member mounted on the inclined surface of the web and arranged extending along only a small part of the longitudinal extent of the element, the member being arranged forming a face spaced from the inclined surface, which face is substantially parallel to the plane passing through the points of contact of the element with the framework and sheet.

5. A structure as defined in claim 4, wherein a hole is provided through the member and associated web, the hole being disposed perpendicularly to the plane through the points of contact, and further including securing means comprising a bolt and nut, the bolt being removably arrangeable in the hole, for anchoring the element to the framework, there being a plurality of the wedge-shaped members spaced along the longitudinal extent of the element, and the securing means including a like number of bolts and nuts as there are wedge-shaped members.

* * * * *